C. WEBER & H. D. SWALLER.
FLUID PRESSURE MOTOR.
APPLICATION FILED AUG. 10, 1910.
1,019,388.
Patented Mar. 5, 1912.
2 SHEETS—SHEET 2.
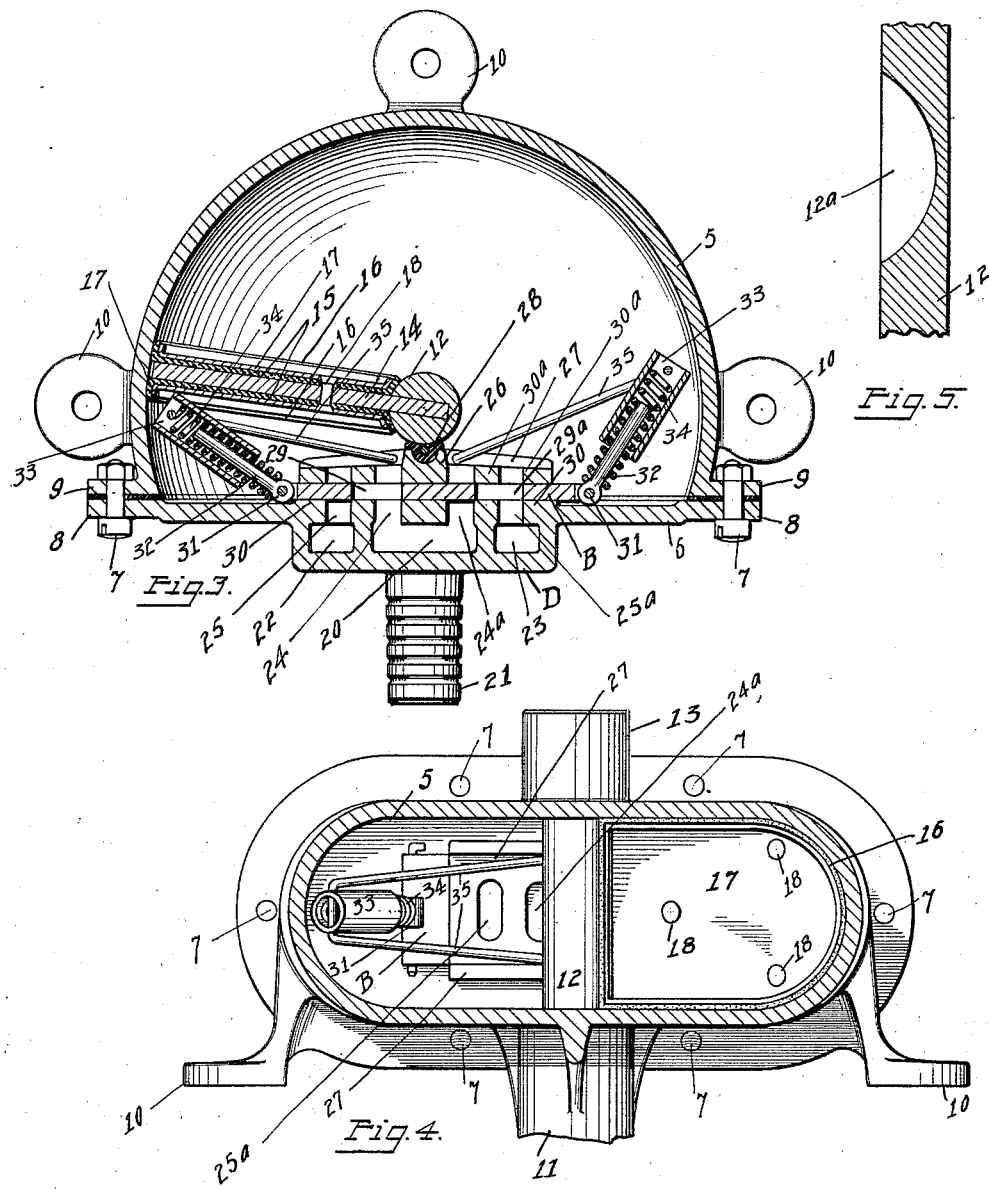
Witnesses
E. B. Maurer
A. L. Phelps
Inventor
Charles Weber.
Henry D. Swaller.
By
C. E. Shepherd.
Attorney

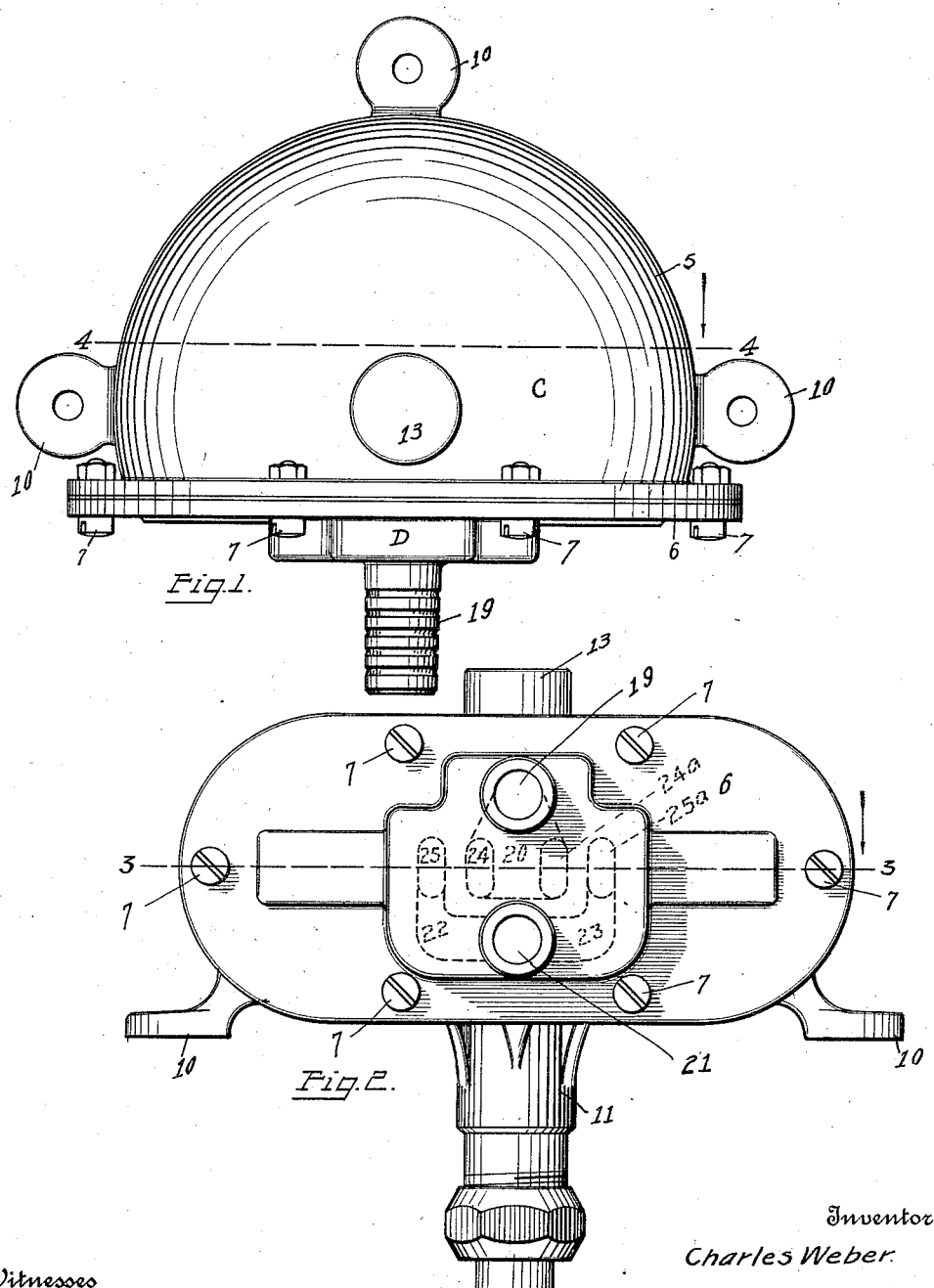

UNITED STATES PATENT OFFICE.

CHARLES WEBER AND HENRY D. SWALLER, OF COLUMBUS, OHIO.

FLUID-PRESSURE MOTOR.

1,019,388.  Specification of Letters Patent.  Patented Mar. 5, 1912.

Application filed August 10, 1910. Serial No. 576,535.

*To all whom it may concern:*

Be it known that we, CHARLES WEBER and HENRY D. SWALLER, citizens of the United States, residing at Columbus, in the county of Franklin and State of Ohio, have invented certain new and useful Improvements in Fluid-Pressure Motors, of which the following is a specification.

This invention appertains to fluid pressure motors, and has especial application to a water motor designed particularly for use in connection with washing machines and similar mechanism.

In the production of the present invention, we aim to provide a water motor which will operate effectively, which comprises comparatively few and simple parts, which will be positive in its operation and which is not liable to be easily deranged or injured.

With the above recited objects and others of a similar nature in view, our invention consists in the construction, combination and arrangement of parts set forth in and falling within scope of the appended claims.

In the accompanying drawings: Figure 1 is a top plan view of a motor embodying our improvements, Fig. 2 is a side view thereof, Fig. 3 is a horizontal sectional view taken on the line 3—3 of Fig. 2 and looking in the direction of the arrow, Fig. 4 is a vertical sectional view taken through the line 4—4 of Fig. 4 and looking in the direction of the arrow, and Fig. 5 is a longitudinal sectional view taken through the shaft.

Referring now to the accompanying drawings in detail, the letter C indicates the casing of the motor as a whole, such casing comprising a semi-circular section 5 forming the piston chamber and the side face 6 connected as by bolts 7 to the piston chamber, said bolts passing through lugs 8 and 9.

The numeral 10 indicates the lugs, through the medium of which the motor may be bolted or fastened to any suitable support. Preferably formed integral with the bottom of the semi-circular casing or chamber, is a sleeve 11, through which passes an operating shaft 12, the upper end of said shaft lying within the cap 13. The shaft 12, at its portion lying within the piston casing or chamber, is slotted as at 12ª to receive and secure the plate 14 extending radially therefrom, said plate forming a central member for the piston. This plate is covered on both sides with a layer 15 of rubber, leather or the like, with the outwardly turned flanges 16, while 17 designates outside dished plates preferably of metal, the parts 14, 15 and 17 being fastened together through the medium of the rivets 18. By reference to Fig. 3, it will be seen that the piston is of sufficient length, so that it reaches from the shaft into contact with the semi-circular wall of the piston casing. The valve casing is indicated as an entirety by the letter D and is formed at the flat side face of the casing or chamber. This valve chamber is provided with the inlet 19 communicating with the channel 20 and the outlet 21 communicating with the channels 22 and 23. The channel 20 communicates with the interior of the casing through the inlet ports 24 and 24ª, while the channels 22 and 23 communicate with the interior of the casing through the outlet ports 25 and 25ª respectively. The numeral 26 designates a supporting stud fastened to the inner side plate 27 of the valve casing, said stud extending inward of the water chamber 20. At its outer end this stud is provided with a bearing 28 for the piston shaft.

The letter B designates a slide valve, preferably in the form of a flat plate having therein the openings 29—29ª, said valve sliding through openings in the outer vertical walls 30 of the valve casing, and through the walls 30ª and stud 26, the walls 30ª and the stud 26 being provided with suitable bores or passages for the sliding valve.

Pivoted at each end of the valve, as at 31, is a rod 32, the rod extending into the tubular members 33, while 34 indicates a spiral spring lying partly within the tubular member, and surrounding the rod 32. The tubular members are connected through swinging arms 35 with the side wall 27 of the valve casing adjacent to the central stud 26, the arrangement being such that the springs normally tend to throw the tubular members and their connected parts upward, as is shown at the right hand side of Fig. 3, when the tubular members are not contacted with and depressed by the piston.

The above is a description of the mechanical construction of our improved motor and the operation of the same is as follows: When the piston and the valve are in the position shown in Fig. 3, the water or other operating fluid, passes through the inlet 19 to the chamber 20, through the port 24 at the left of the center of the valve and into the piston chamber. It will now push the piston around toward the right and as the piston approaches the right hand side of the casing, the fluid back of the same, will pass down through the port 25ª and out through the channel 23 at the right of the piston. As the piston strikes the tubular member 33, the latter is depressed with its connected rod 32, and this pushes the slide valve toward the left so that the water will now pass in through the chamber 20, through the port 24ª at the right of the center of the slide valve, thence into the piston chamber, while the water which has been back of the piston, escapes through the channels, openings and ports at the left of the piston and so on to the outlet.

It will be noted that we have provided an exceedingly simple arrangement of valve and one which presents comparatively few parts, the possibility of a derangement of the motor being thereby greatly lessened. Furthermore, it will be noted that our improved arrangement of slide valve and actuating members at the ends thereof enables the valve to be positively moved back and forth to alternately permit the water to enter at one side of the piston and out through the opposite side, so that an oscillating motion is imparted to the piston to impart to the shaft the desired motion for actuating the dasher or other means within the tub.

While we have herein shown and described one particular embodiment of our invention, we wish it to be understood that we do not limit ourselves to all the precise details of construction herein shown by way of illustration, as modification and variation may be made without departing from the spirit of the invention or exceeding the scope of the claims.

It will further be noted that we form the cylinder and the bearings and the supporting legs for the casing, in one piece, thereby obtaining a unitary structure and avoiding the occurrence of numerous joints in the motor.

Furthermore, we so construct the operating parts of the valve that they are interchangeable, and the bottom plate and all the parts, including the shafts, are forced against leather packing.

What we claim, is—

1. A water motor comprising an oscillating piston, a slide valve, a buffer connected to each end of said slide valve, and means governed by the throw of said slide valve for swinging either buffer into the path of said piston.

2. A water motor comprising a casing, an oscillating piston, a slide valve, a buffer pivoted to each end of said slide valve, and links connected to said casing and to said buffer whereby reciprocation of said slide valve alternately throws said buffer into the path of said piston.

3. A water motor comprising an oscillating piston, a slide valve adapted to receive reciprocatory impetus by the piston at the end of its movement in each direction, and a rod pivoted at each end of said valve, a tubular casing on each rod, and a spring within each casing and interposed between each rod and its casing, said rods, casing and springs forming resilient buffers.

4. The combination with a casing, a shaft extending therethrough, a piston comprising a central section connected to the shaft, and side plates connected to said central section, a valve chamber having an inlet and an outlet, a central water chamber within the valve chamber and communicating with the piston casing, said valve chamber having outlet channels and ports at opposite sides of the water chamber, and a sliding valve provided with openings for controlling the inlet and outlet of the fluid to the piston chamber, and spring tensioned pivoted members at the ends of the sliding valve adapted to be actuated by the piston to reciprocate such valve.

5. The combination with a piston casing formed of a single piece of metal and having bearings and legs formed integral therewith, a piston oscillating within the casing, a valve casing connected to the chamber and having inlet and outlet ports, a valve sliding in said chamber, and spring tensioned members pivoted at the ends of the valve, and connected through rods with the side wall of the valve casing, said members being adapted to be depressed by the movement of the piston to shift the valve.

In testimony whereof we affix our signatures in presence of two witnesses.

CHARLES WEBER.
HENRY D. SWALLER.

Witnesses:
C. C. SHEPHERD,
INGLE A. MORRIS.

---

Copies of this patent may be obtained for five cents each, by addressing the "Commissioner of Patents, Washington, D. C."